United States Patent [19]

Angelo

[11] 4,037,580

[45] July 26, 1977

[54] MEAT COOKING APPARATUS

[76] Inventor: Nicholas C. Angelo, 8702 Bob White, Houston, Tex. 77036

[21] Appl. No.: 582,724

[22] Filed: June 2, 1975

[51] Int. Cl.$^2$ .......................... A47J 37/07; F24B 3/00
[52] U.S. Cl. ..................................... 126/25 R; 99/446
[58] Field of Search ....................... 99/446, 447, 482; 126/25 R, 25 A, 9 R

[56] References Cited

U.S. PATENT DOCUMENTS

| | | | |
|---|---|---|---|
| 2,722,883 | 11/1955 | Rignell | 99/446 X |
| 2,746,377 | 5/1956 | Parks | 126/25 R X |
| 3,040,651 | 6/1962 | Nolte, Jr. | 99/446 |
| 3,049,071 | 8/1962 | Diack | 99/446 X |
| 3,217,634 | 11/1965 | Fox | 99/446 X |
| 3,299,800 | 1/1967 | Angelo | 99/446 X |

Primary Examiner—William F. O'Dea
Assistant Examiner—Harold Joyce
Attorney, Agent, or Firm—Donald Gunn

[57] ABSTRACT

A meat cooking apparatus which includes a container having a closable lid thereon and a fire grate in the bottom. The grate holds the coals of a charcoal fire. Meat is supported on a grill thereabove. The cylindrical housing has a lid which is selectively closable. An improved feature of the present apparatus is the incorporation of a removable baffle plate positioned between the fire grate which supports the charcoal fire and the grill which supports the meat. Preferably, it comprises a circular baffle plate which is inserted therebetween, resting on sidewall located supports and includes a few openings drilled therein to enable smoke rising from the fire to impinge directly on the meat. In addition, it is sized to define a peripheral slot enabling access of smoke through the slot to the meat to be cooked.

7 Claims, 4 Drawing Figures

MEAT COOKING APPARATUS

BACKGROUND OF THE INVENTION

One of the most delectable ways to prepare meat is to cook it on a barbeque grill over a charcoal fire. A delicate balance must typically be maintained between the size of the charcoal fire and the distance of the meat. If the meat gets too hot, the surface is sometimes seared which tends to blacken the exterior, leaving it overcooked while the interior of the meat is undercooked. Contrariwise, if the spacing is to great, too much time is required for cooking. While uniform cooking can be more easily obtained at a great distance, there is also a danger that a slow cooking technique will excessively dry the meat by overextended exposure to elevated temperatures. The optimum situation is best obtained by cooking at an elevated temperature without exposure of the meat to direct flames from the fire with adequate circulation of the smoke rising from the fire to impart a typical smokey taste to the meat where the cooking time is somewhat reduced, thereby avoiding excessive drying of the meat.

The apparatus of this invention is uniquely adapted to serve the purpose mentioned above. The apparatus modifies a typical barbeque pit. In particular, it is adapted for use in a portable barbeque pit as opposed to the brick masonary type of pit which typically casts many hundreds of dollars and is a permanenet fixture in the real estate. This apparatus is particularly adapted for use with a small portable barbeque cooking device which is generally characterized as having a closed cylindrical container supported on legs. This device has found substantial acceptance with the purchasing public in the last several years. The improvement which is incorporated by the present invention enhances the ability of the barbeque pit, as it will be described hereinafter by enabling the user to place meat directly over the charcoal fire without fear of burning or searing the meat.

SUMMARY OF THE INVENTION

The apparatus of this invention is an inprovement for use in a portable barbeque pit. It is intended for use with a barbeque pit typically fabricated with a closed container having a lid or cover thereon which opens and closes. In the closed container, a fire grate at the bottom supports a charcoal fire. Controlled dampers admit air below the fire grate to feed the fire. The fire grate is located in the bottom portions beneath a rack which supports the meat to be cooked. The lid or cover typically has an opening of flue damper which is controllably positioned to regulate the volume of smoke accumulated in the upper reaches of the closed container thereby controlling the amount of smoke and heat which impinges on the meat. The meat is supported on the rack in the smokey atmosphere. The improvement of the present invention incorporates a removable baffle. The baffle is placed between the grill and the fire to prevent direct impingement of flames from the fire on the meat. Flames typically occur especially when drippings from the meat including grease fall into the fire which in ordinary circumstances causes flaring of the fire. A few openings in the baffle enable any drippings accumulated on the baffle to fall into the fire but the openings are sufficiently small to prevent large scale flaring of the fire to sear the meat. The baffle is preferably circular to fit within the circular portable barbeque pits which are in the vogue.

DESCRIPTION OF THE PREFERRED EMBODIMENT

Figure 2:
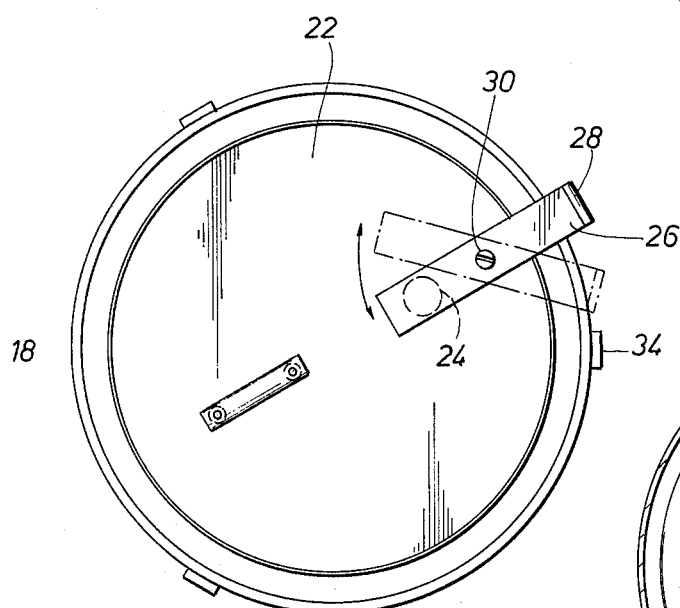
FIG. 2 is a plan view of the barbeque pit shown in FIG. 1.
Figure 4:
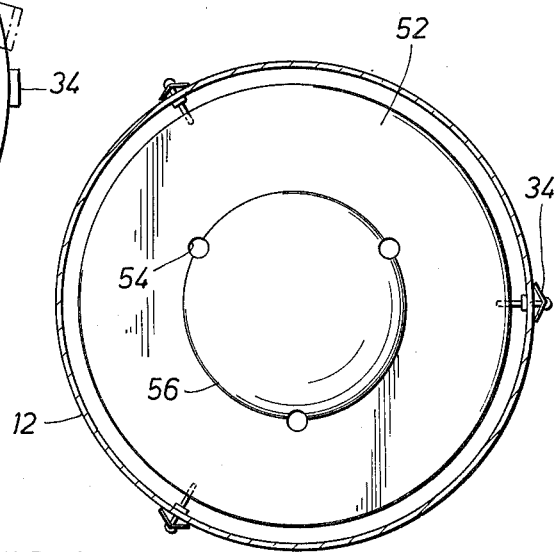
FIG. 4 shows the baffle of the present invention which is positioned between the fire and the meat.

In the drawings, the numeral 10 identifies a portable circular barbeque pit. The barbeque pit is formed in a housing or container. The device includes a lower housing 12 which has a slightly tapered cylindrical wall. The wall supports a bottom 14. The bottom 14 is spotwelded or otherwise crimped to join to the wall. The wall extends upwardly to a reinforcing ring which ring is supportive of a circular lip or bead 16 folded over and around at the top edge of the wall. The container further includes a top portion 18. The top 18 has a tapered wall but it is otherwise generally cylindrical. The top portion 18 terminates in a rolled lip or bead 20 which matches the bead 16 in size so the two portions stack. The bead 20 thus abuts against the bead 16. This provides a fairly tight seal although obviously an airtight seal is not necessary. The top 18 is closed over by a lid 22. The lid 22 incorporates a small opening 24 shown in FIG. 2. The opening 24 provides an exhaust to control the accumulation of smoke in the top 18. It is made into a damper by a controlable valve member. The valve member preferably has the form of a rectangular metal strip 26 which has a hand grip made of an upbent tab 28 at its remote end. It is pivotly mounted by a sheet metal screw 30. The metal strip 26 pivotly rotates to fully cover or fully expose the opening 24. Preferably, some friction is encountered in rotation of the strip 26 so that it will remain at the position achieved relative to the opening 24. Of course, the opening 24 may be partially opened to controlably exhaust smoke accumulated in the barbeque pit 10.

Figure 1:
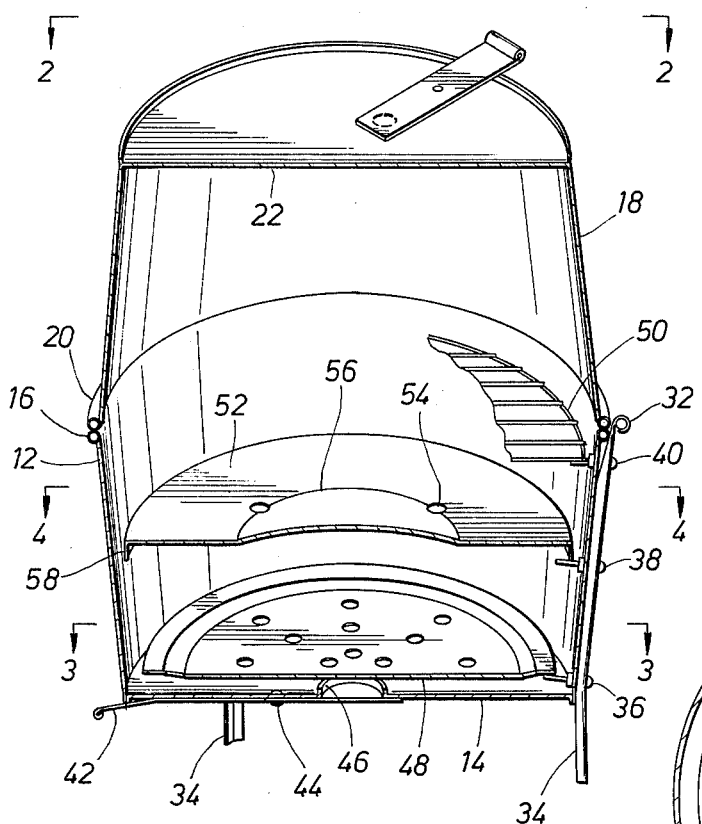
FIG. 1. is a view showing details of construction of a barbeque pit modified to incorporate the present improvements.
Figure 3:
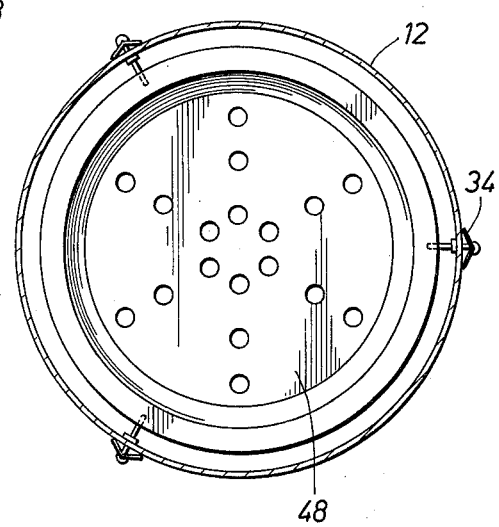
FIG. 3 is a sectional view along the line 3—3 showing details of construction of the fire grate and the support apparatus therefore.

The housing top 18 is hinged at 32 in FIG. 1. The hinge enables the top 18 to be raised and lowered. The bottom portion 12 of the housing is supported on three legs 34. The legs preferably are elongate members which extend along the side as illustrated in FIG. 1. There, it will be observed that the leg 34 is secured to the lower portion 12 by means of nuts and bolts. In particular a bottom bolt 36 extends through the leg and through the sidewall of the housing 12. The bolt is sufficiently long to extend into the housing to provide a brace or support as will be described. A second bolt 38 likewise extends into the interior of the closed housing. A third bolt 40 functions in the same manner and also extends into the housing. The bolt 40 likewise serves as a support to be described.

Fresh air is supplied to the interior for feeding the fire. The fresh air feed is controlled by means of a damper 42. The damper is supported on a bolt 44. The damper is preferably a wide metal strip. It is pivoted open and shut adjacent to an opening 46 made in the bottom plate 14. The opening 46 admits fresh air in a controlled volume. The air is drawn into the barbeque pit by induction as a result of the heated rising in the interior. This creates a slight draft upwardly through the opening 46. The air flow is regulated by the position of the damper 42.

As mentioned, the apparatus includes three legs. Each of the legs is supported by a bolt 36. This provides three bolts which are located at the same relative elevation within the barbeque pit. The three bolts all support a fire grate 48. The fire gate 48 supports the charcoal which is consumed to provide the necessary heat for operation of the device. Preferably, charcoal bricketts are placed on the fire grate 48 and they are ignited to provide the necessary heat. The fire grate 48 is drilled at a number of openings to admit fresh air from below. The air rises through the charcoal brickettes to support combustion.

The bolts 40 which extends through the sidewall of the bottom portion 12 also support a circular grill work 50. The grill work 50 is formed of a circular wire ring which has a number of parallel wire rods thereacross. The rods are spaced sufficiently close to support meat thereon.

The space between the firegrate 48 and the grill 50 is normally open. The improvement of the present invention through contemplates the use of the bolts 38 as a support for a baffle 52. The baffle 52 is a circular plate which has a profile conforming to the transverse section of the lower portion 12. The baffle 52 thus leaves a peripheral gap. This gap permits smoke and heat to rise around the edge. In addition, openings 54 are drilled in the baffle at strategic locations. The openings 54 enable the heat and smoke to also rise through the center of the baffle at least in a limited amount. In addition, the baffle is preferably shaped as shown in the sectional cut line of FIG. 1. That is to say, it includes a shallow trough or indentation of circular configuration at 56 which collects drippings from thereabove, this being the lowest place on the baffle 56. Drippings collect in this trough. It is preferably fully circular about the baffle. Two or three openings 54 intersect the bottom most point or trough 56. This enables any liquid accumulated on the baffle to drip through the openings 54 to the fire below to be consumed. The fire readily consumes the drippings especially when they are heavily laden with combustible grease. While this may cause flaring, the flaring does not cause flames to reach the meat and thereby sear it. Rather, the baffle 56 which is interposed between the fire and the meat shields the meat from substantial flaring. It cuts down on the radiant heat directed at the meat and rather forces the meat to be cooked by exposure to the heated air and smoke. A reduction in the radiant heat and the direct flames impinging on the meat improves on the quality of the cooked meat. The baffle 56 is subjected to substantial heating when in use and to this end, an encircling lip 58 is incorporated about its periphery and extends downwardly to provide a shoulder which prevents warping and rests on the bolts 38.

The lower portion 12 of the apparatus preferably tapers. As a result, the firegrate 48 is preferably smaller in diameter than the baffle 52. The baffle 52 in turn is smaller than the grate 50. Moreover, the bolts 36 can extend substantially inwardly to suport the firegrate. However, the bolts 38 are preferably somewhat shorter owing to their location and as a consequence, the firegrate 48 can be inserted past the bolts 38. On the otherhand, the baffle 52 cannot be inserted past the bolts 38. The same is also true of the bolts 40. Preferably, they are somewhat short but sufficiently long to support the grate 50 while permitting insertion of the firegrate 48 and the baffle 52. This enables the equipment to be assembled and disassembled after use for ease of cleaning and servising.

In operation, the device is assembled in the manner shown in the drawings. Prior to insertion of the baffle 52, charcoal brickettes are placed on the firegrate 48 and they are ignited in some suitable fashion. The fire which is created in the apparatus becomes well established and at that juncture, the baffle 52 is placed above the fire. Then, the grill 50 is positioned as shown and meat is placed on the grill. The fresh air damper 42 is adjusted. The lid 18 is closed and the smoke damper 26 is adjusted, thereby regulating the induction of fresh air and the exhaustion of smoke. The baffle 52 protects the meat from direct flame impingement and additionally reduces the radiant cooking. The baffle plate itself becomes quite heated and the heat liberated from the charcoal brickettes is thus converted substantially to a hot air furnace. This alters the manner in which the meat is cooked thereby providing a better quality of cooking. In particular, the tendency to burn, sear or otherwise damage the exterior of the meat is measurably reduced.

The foregoing is directed to the preferred embodiment but the scope therof is determined by the claims which follow.

I claim:

1. For use in a cylindrical barbeque pit having a housing supported on a set of legs and which housing encloses a fire grate in the lower portions thereof and a meat receiving grill is located above the fire grate, the improvement comprising a baffle plate which has a shape closing off the housing between the fire grate and the meat receiving grill and which further defines an edge located gap about said baffle to enable heat and smoke to rise therepast to indirectly impinge on the meat and wherein said baffle is a solid member having grease and dripping collecting surface comprising,
    a circular inner sloping surface connected to
    an outer sloping surface, said connection forming a circular valley disposed near the center of said housing
    the inner and outer sloping surface having sufficient slopes for grease and drippings to flow toward said valley,
    said valley intersecting an opening means for dropping collected grease and drippings into the fire below for burning and which opening is sufficiently small to prevent upward flaring of flames to impinge on the meat receiving grill.

2. The apparatus of claim 1 wherein said baffle has a peripheral reinforcing means which prevents buckling on exposure to heat.

3. The apparatus of claim 2 wherein said baffle is adapted to be rested for removal and insertion on at least three inwardly protruding members on the wall of the housing.

4. The apparatus of claim 1 wherein said inner sloping surface and said outer sloping surface are conically shaped.

5. The apparatus of claim 1 wherein said inner sloping surface and said outer sloping surface are spherically shaped.

6. The apparatus of claim 1 wherein said inner sloping surface is conically shaped and said outer sloping surface is spherically shaped.

7. The apparatus of claim 1 wherein said inner sloping surface is spherically shaped and said outer sloping surface is conically shaped.

* * * * *